United States Patent [19]
Ogura et al.

[11] Patent Number: 5,294,997
[45] Date of Patent: Mar. 15, 1994

[54] IMAGE SIGNAL WITH PILOT SIGNAL RECORDING APPARATUS

[75] Inventors: Tokihiko Ogura; Kazuhito Ohashi; Ryo Fujimoto; Takao Sasakura, all of Kanagawa, Japan

[73] Assignee: Canon Kabushiki Kaisha, Tokyo, Japan

[21] Appl. No.: 969,559

[22] Filed: Oct. 30, 1992

Related U.S. Application Data

[63] Continuation of Ser. No. 457,275, Dec. 27, 1989, abandoned.

[30] Foreign Application Priority Data

Dec. 28, 1988 [JP] Japan .................................. 63-329418

[51] Int. Cl.⁵ .............................................. H04N 5/76
[52] U.S. Cl. ...................................................... 358/342
[58] Field of Search ................. 358/310, 330, 320, 342, 358/323, 324, 325, 326

[56] References Cited

U.S. PATENT DOCUMENTS

| | | | |
|---|---|---|---|
| 4,725,895 | 2/1988 | Miyamoto et al. | 358/324 |
| 4,768,102 | 8/1988 | O'Gwynn | 358/324 |
| 4,779,143 | 10/1988 | Oku et al. | 358/324 |
| 4,809,084 | 2/1989 | Morimoto et al. | 358/324 |
| 4,980,779 | 12/1990 | Sakata | 358/324 |

Primary Examiner—Donald E. McElheny, Jr.
Attorney, Agent, or Firm—Robin, Blecker, Daley & Driscoll

[57] ABSTRACT

An image signal recording and reproducing system which records on a recording medium one picture amount of high definition image signal composed of a plurality of different field image signals and is arranged as follows: in recording the field image signals in different areas on the recording medium respectively, a modulated carrier signal modulated with an information signal other than an image signal is recorded in a state of being multiplexed with one part of the field image signals; and a pilot signal for correcting time base variations is recorded in a state of being multiplexed with the other part of the field image signals. This arrangement enables the system to record and reproduce information other than the image signal and to reproduce an image with a high degree of fineness by accurately correcting time base variations occurring during recording and reproduction.

7 Claims, 7 Drawing Sheets

IMAGE SIGNAL WITH PILOT SIGNAL RECORDING APPARATUS

This is a continuation application under 37 CFR 1.65 of prior application Ser. No. 457,275, filed Dec. 27, 1989, abandoned.

BACKGROUND OF THE INVENTION

1. Field of the Invention

This invention relates to an image signal recording and reproducing system for recording an image signal on a recording medium and reproducing the recorded image signal from the recording medium.

2. Description of the Related Art

An electronic still video camera (hereinafter referred to as a floppy camera) has been commmercialized. The floppy camera is arranged to record, as a still image signal, an image signal obtained from an image sensor such as a CCD (charge-coupled device) or the like on a disc-shaped magnetic recording medium or a video floppy disc. Unlike a silver-halide type photograph, the image recorded by the floppy camera can be instantly reproduced and appreciated either on a TV monitor set or in the form of a hard copy without any developing process.

However, the picture quality, or particularly the resolution, of the image obtained by the floppy camera is determined almost solely by the number of picture elements of the image sensor. More specifically, the resolution in the horizontal direction is limited by the number of picture elements in the horizontal direction. The resolution in the vertical direction is determined by the number of scanning lines obtained according to the current NTSC system.

To solve this problem, a method has been considered for obtaining an image with a degree of resolution of about $1300 \times 1000$ picture elements which is equal to the HDTV (high definition TV) while retaining interchangeability with the conventional still video system. FIG. 1 of the accompanying drawings shows this method. Referring to FIG. 1, the $1300 \times 1000$ picture elements include picture elements indicated by a mark "◯" and picture elements indicated by a mark "X". There are about 650 picture elements "◯" or "X" in the horizontal direction and 500 picture elements "◯" or "X" in the vertical direction. The picture element signals of all lines consisting of these picture elements "◯" or "X" are recorded on the video floppy disc by assigning them to four tracks A, B, C and D. In reproducing the record, the picture element signals separately recorded in these tracks on the video floppy disc are recombined on a semiconductor memory and interpolation is made between the picture elements, so that an image consisting of 1300 (horizontal) $\times$ 1000 (vertical) picture elements can be obtained by means of a printer or the like as a print which withstands comparison with a silver-halide photograph.

In this case, the image signal is output from the image sensor in the following manner: electric charges accumulated at the image sensor must be read out within a shortest possible period of time for the purpose of preventing S/N ratio deterioration due to an increase in a dark current. To meet this requirement, the electric charge of each of the lines A and B is read out, for example, within a period during which a magnetic head is tracing one track on the video floppy disc and the electric charge on that of each of the lines B and C while the head is tracing a next track on the video floppy disc.

More specifically, the operation is as follows: the magnetic head has two channels 1 and 2 as shown in FIG. 2. A signal obtained from the line A on the image sensor is supplied to the channel 1 simultaneously with a signal which is obtained from the line B and supplied to the channel 2 of the head while the video floppy disc makes one turn. Then, while the disc makes another turn, the magnetic head is shifted to distant of a two-track-pitch to supply signals obtained from other lines C and D on the image sensor simultaneously to the channels 1 and 2 of the two-channel magnetic head.

In this instance, the position in a track pattern of the horizontal synchronizing signal (hereinafter referred to as the H-sync signal) of the image signal recorded in each track is preferably in a so-called H alignment (H: a horizontal synchronizing period) between the tracks A and B and between the tracks C and D as well known and as shown in FIG. 2 in consideration of a cross-talk which tends to take place in recording between the channels of the magnetic head. With the floppy camera arranged in this manner, in reproducing a frame image with a two-channel magnetic head of the conventional still video reproducing apparatus, the frame image can be simply reproduced by reproducing the record from the tracks B and C, because the H alignment of the tracks A and B deviates ½ H from that of the tracks C and D.

In the method shown in FIG. 1, the picture elements forming an image signal are arranged by shipping every other picture element in recording the data of the points "◯" and "X" on a video floppy disc according to the currently practiced still video format. In accordance with this method, "sampled values" transfer is performed instead of "wave form" transfer. This necessitates that the transfer function of the total transfer path required for the magnetic recording or reproducing and frequency modulation or demodulation is in conformity with the well-known first criterion of Nyquist.

Further, in reproducing, sampling points used in recording must be accurately re-sampled. It is, therefore, necessary to use a time base corrector (TBC) for accurately correcting, within the H period, any time base variations, occurring in the magnetic recording and reproducing systems.

For this purpose, it is conceivable to record a continuous pilot signal (fT) by frequency-multiplexing it with the image signal between the frequency band of a frequency-modulated color-difference line-sequential signal (C) and that of a frequency-modulated luminance signal (Y). In accordance with this method, the frequency of the pilot signal fT is set, for example, between 2.5 and 3.5 MHz. Therefore, the time base correction can be accomplished at a high degree of precision.

The above-stated pilot signal is not included in the currently practiced still video format. If the pilot signal fT is recorded by frequency-multiplexing it with the image signal interchangeability would be lost. This is a serious problem.

In a conceivable solution of this problem, an ID signal, which has conventionally been recorded on a video floppy disc along with the image signal by DPSK (differential phase shift keying)-modulating a given carrier signal according to information on the year, month, day, hour, minute, second, etc. corresponding to the image signal, may be utilized as the pilot signal by recording it without modulation on the video floppy disc along with the image signal. However, if the whole ID signal to be recorded is changed into an unmodulated continuous carrier signal, no data for the year, month, day, hour, minute, second, etc. can be recorded. Then, in cases where a reproducing operation is to be performed by a reproducing apparatus arranged in conformity to the currently practiced still video format, this solution would cause inconvenience.

SUMMARY OF THE INVENTION

It is a general object of the invention to provide an image signal recording and reproducing system which is capable of solving the above-stated problems.

It is a more specific object of the invention to provide an image signal recording and reproducing system which is capable of recording and reproducing information other than an image signal in addition to the image signal and is arranged to give a reproduced image with a high degree of definition by accurately correcting any time base variations that take place during recording and reproduction.

This objective is achieved by an image signal recording apparatus arranged according to this invention to record, on a recording medium, one picture amount of high definition image signal composed of a plurality of field image signals different from each other, comprising pilot signal generating means for generating a pilot signal for correcting time base variations; modulated carrier signal generating means for generating a modulated carrier signal modulated with an information signal other than an image signal; and recording means, arranged to input the plurality of field image signals, for recording the plurality of field image signals in different areas on the recording medium respectively, the recording means recording the modulated carrier signal generated by the modulated carrier signal generating means in a state of being multiplexed with one part of the plurality of field image signals and recording the pilot signal generated by the pilot signal generating means in a state of being multiplexed with the other part of the plurality of field image signals.

The above and other objects and features of the invention will become apparent from the following detailed description of embodiments thereof taken in connection with the accompanying drawings.

BRIEF DESCRIPTION OF THE DRAWINGS

FIG. 6 also shows a recording track pattern formed, on a video floppy disc by the embodiment.

DETAILED DESCRIPTION OF THE PREFERRED EMBODIMENTS

Figure 3:
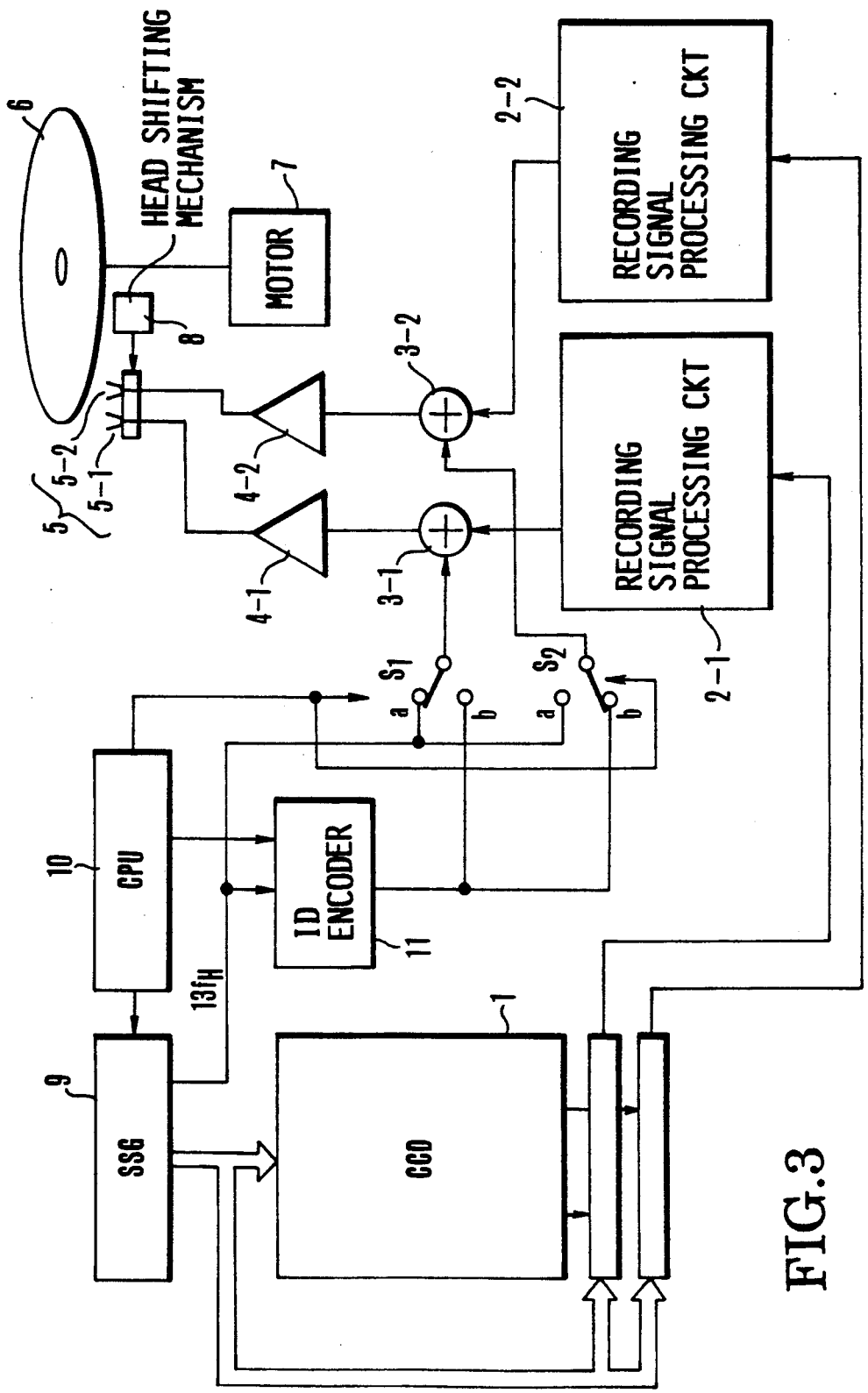
FIG. 3 is a block diagram showing the arrangement of the essential parts of a recording system included in a floppy camera which is arranged according to this invention as an embodiment thereof.

The following describes details of the invention through the preferred embodiments thereof:

FIG. 3 is a block diagram showing the arrangement of the essential parts of a recording system included in a floppy camera arranged as an embodiment of this invention. Referring to FIG. 3, a CCD 1 which is solely for a black-and-white image has, for example, about 1300 picture elements aligned in the horizontal direction and about 1000 picture elements aligned in the vertical direction. The picture elements are arranged in a rectangular lattice like shape. Recording signal processing circuits 2-1 and 2-2 are arranged to convert two field amounts of image signals which are simultaneously output from the CCD 1 into signals to be recorded on a video floppy disc. Addition circuits 3-1 and 3-2 are arranged to mix an ID signal with the frequency-modulated luminance signals Y-FM output from the recording signal processing circuits 2-1 and 2-2. Recording amplifiers 4-1 and 4-2 are arranged to amplify the outputs of the addition circuits 3-1 and 3-2. A two-channel magnetic head 5 consists of a magnetic head 5-1 of a channel 1 and a magnetic head 5-2 of a channel 2. A reference numeral 6 denotes a video floppy disc. A numeral 7 denotes a spindle motor. A head shifting mechanism 8 is composed of a stepper motor, etc. A synchronizing signal generator (hereinafter referred to as SSG) 9 is arranged to generate operation timing pulses for driving the CCD 1 and controlling the timing of a recording operation, the carrier of the ID signal and other synchronizing (hereinafter referred to as sync) signals. A CPU 10 is arranged to control the whole recording system. An ID encoder 11 is arranged to modulate the ID signal Carrier (13 fH) by differential-phase-shift-keying (DPSK) to provide an output pilot signal from the SSG 9 on the basis of information data. A switch S1 is arranged to select the state of the carrier of the ID signal supplied to the magnetic head 5-1 from between an unmodulated state (side "a") and a modulated state (side "b"). Another switch S2 is arranged to make selection between the unmodulated state (one side "a") and the modulated state (the other side "b") of the carrier of the ID signal supplied to the magnetic head 5-2.

Figure 1:
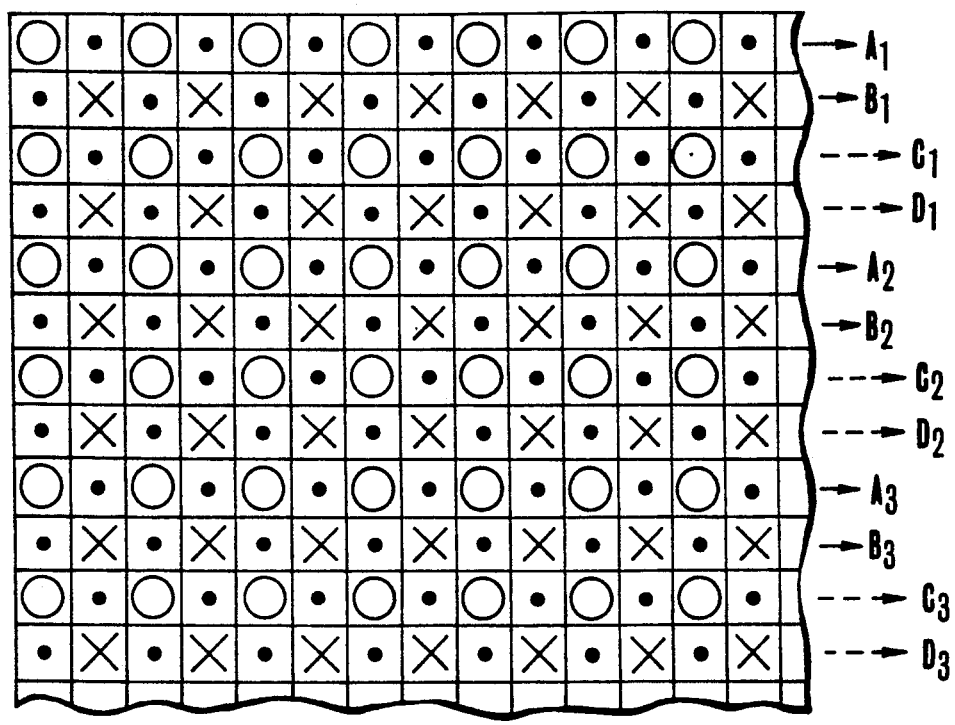
FIG. 1 shows the picture element allocation of an image sensor arranged in a floppy camera.
Figure 2:
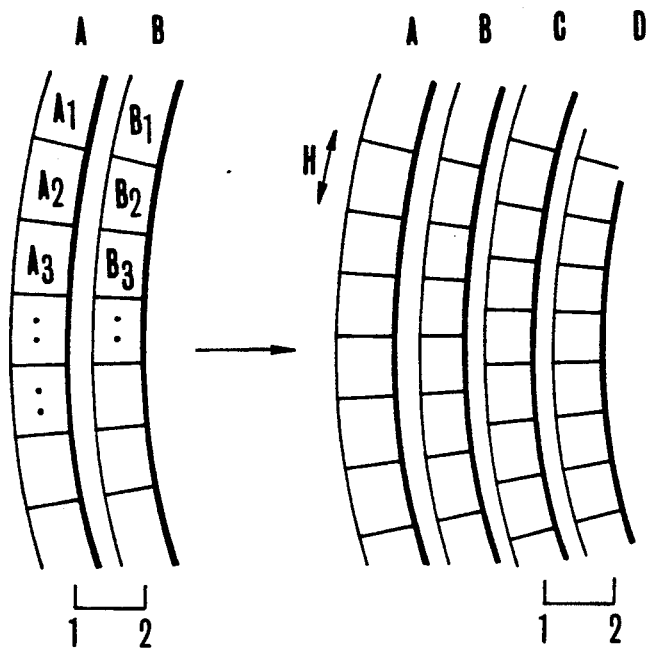
FIG. 2 shows a recording track pattern formed on a video floppy disc by the floppy camera.

The arrangement shown in FIG. 3 operates as follows: when the CPU 10 is instructed to begin a recording action by an operation performed on a recording start button provided in an operation part which is not shown, the signals of the picture elements of A lines including the lines A1, A2, A3, etc., and the signals of the picture elements of B lines including the lines B1, B2, B3, etc., which are as shown in FIGS. 1 and 2, are simultaneously output from the CCD1. In this instance, the driving clock signal output from the SSG 9 for driving the CCD 1 is set at 780 fH (fH: horizontal sync signal frequency). The phase of the driving clock signal for reading out the picture element signals of lines A and C is arranged to differ 180 degrees from the phase of the driving clock signal for reading out the picture element signals of lines B and D. The arrangement is such that, during one H period, the effective picture element signals of about 650 picture elements are obtainable from each of these lines.

At each of the recording signal processing circuits 2-1 and 2-2, a sync signal is added to the signal coming from the CCD 1. The signal is then subjected to a pre-emphasis process. After that, the signal is frequency-modulated with a carrier frequency and a deviation set according to the conventional still video format.

Further, at that time, a control signal from the CPU 10 causes the position of the switch S1 to be on the side "a" and that of another switch S2 to be on the side "b" thereof. The carrier of the ID signal is recorded in the track A in the unmodulated state and in the track B in a state of having been DPSK-modulated according to information data by the ID encoder 11.

The carriers of the ID signal thus output from the switches S1 and S2 are supplied to the addition circuits 3-1 and 3-2 to be mixed with the frequency-modulated luminance signals Y-FM output from the recording signal processing circuits 2-1 and 2-2. The mixed signals thus obtained are amplified by the recording amplifiers 4-1 and 4-2. The amplified signals are simultaneously recorded as two field amounts of image signals in two tracks (tracks A and B as shown in FIG. 2) on the video floppy disc 6 which is being rotated at a constant speed of 3600 rpm by the spindle motor 7. Further, the tracks A and B have the image signal recorded in the state of the so-called H alignment in a well-known manner.

Next, the magnetic head 5 is moved by the head shifting mechanism 8 to the extent of two track pitches (or 200 μm) toward the rotating axis of the video floppy disc 6. After that, the signals of the picture elements of the lines C and D of FIGS. 1 and 2 are recorded. The recording action on the picture element signals of the lines C and D differs from the recording action on the picture element signals of the lines A and B in the following point: the carrier of the ID signal which is DPSK-modulated on the basis of the information data by the ID encoder 11 is recorded in the track C along with the image signal while the unmodulated carrier of the ID signal is recorded in the track D along with the image signal. In this case, therefore, the position of the switch S1 is shifted to the side "b" thereof and the switch S1 to its side "a" by the control signal from the CPU 10. The image signal is recorded in the tracks C and D in the state of H alignment between the tracks C and D. The H alignment is, however, set back ½ H from the H alignment of the tracks A and B as viewed between the tracks B and C.

The image signal which is recorded on the video floppy disc in this manner enables a reproducing apparatus which is adapted to the conventional still video format, to frame-reproduce the record from the tracks B and C to obtain a frame image. Further, by demodulating the ID signal recorded along with the image signal, the information data corresponding to the image signal can be restored to its original state. Therefore, interchangeability can be retained according to the arrangement of the embodiment.

Next, the reproducing system of the floppy camera which, reproduces the image signal recorded in the four tracks on the video floppy disc by the recording system of the floppy camera shown in FIG. 3 is arranged as described below with reference to FIG. 4.

Figure 4:
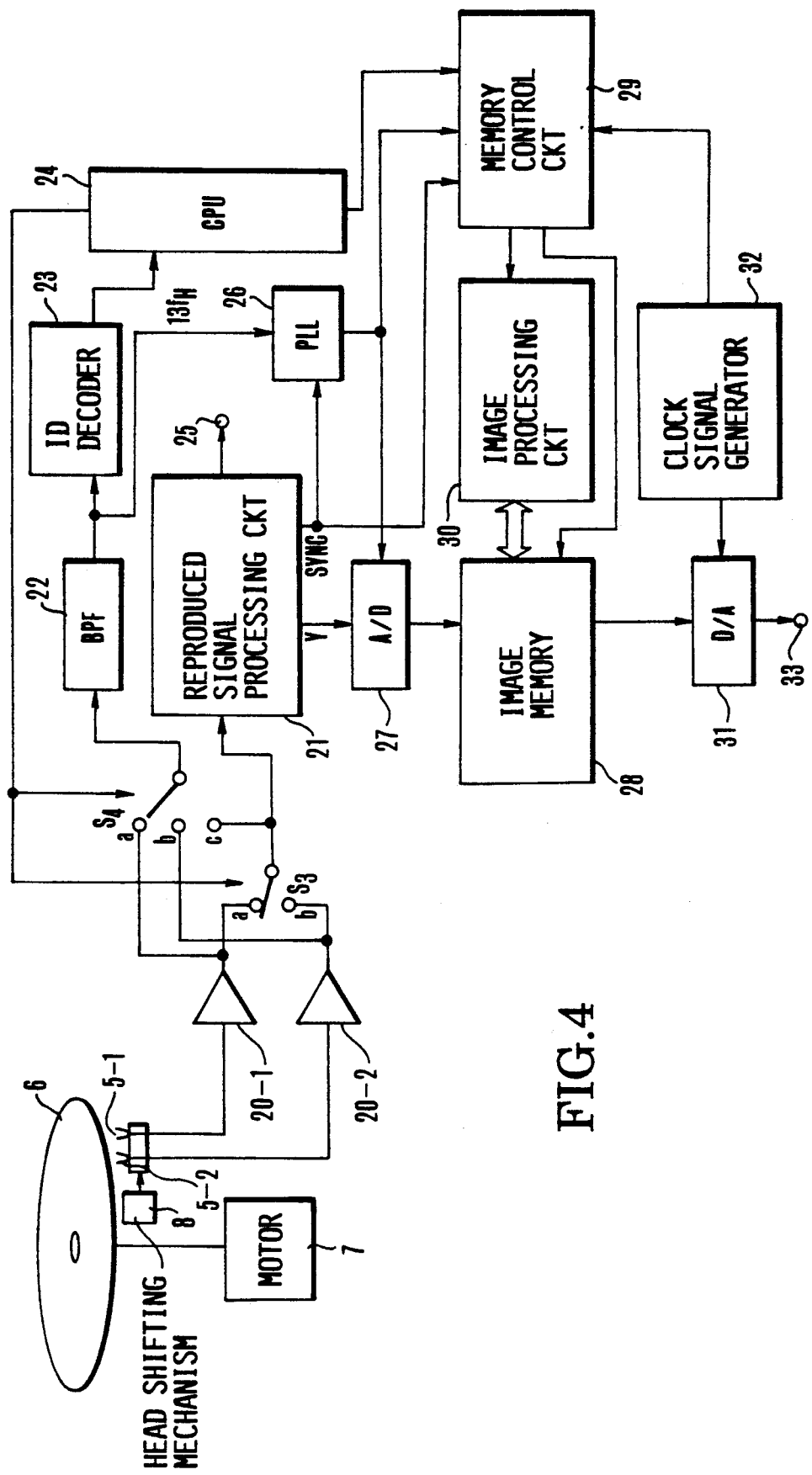
FIG. 4 is a block diagram showing the arrangement of the essential parts of a reproducing system included in the same floppy camera arranged as the embodiment of the invention.

FIG. 4 shows in a block diagram the arrangement of the essential parts of the reproducing system of the floppy camera which is arranged as an embodiment of the invention. In FIG. 4, the component parts which function in the same manner as those of FIG. 3 are indicated by the same reference numerals. A reproduction amplifier 20-1 is provided for the magnetic head 5-1. Another reproduction amplifier 20-2 is provided for the magnetic head 5-2. A reproduced signal processing circuit 21 demodulates the frequency-modulated luminance signal and lowers a noise by a de-emphasis process to convert the luminance signal into its original state. A band-pass filter (BPF) 22 is arranged to take out the ID signal carrier (13 fH). An ID decoder 23 is arranged to demodulate the carrier of the DPSK-modulated ID signal back to the information data. A CPU 24 is arranged to control the operation of the whole reproducing system. An output terminal 25 is provided for outputting the luminance signal. A PLL (phase-locked loop) circuit 26 is arranged to form an image memory writing clock signal from the unmodulated carrier of the ID signal which has the same jitter component as the reproduced image signal. The system further includes an analog-to-digital (A/D) converter 27; an image memory 28; a memory control circuit 29 which is arranged to generate control signals for writing and reading into and from the memory 28; an image processing circuit 30 which is arranged to perform picture element interpolation, etc. by using data stored in the image memory 28; a digital-to-analog (D/A) converter 31; a clock signal generator 32 which is arranged to generate a clock signal for reading from the image memory 28; and an output terminal 33 for outputting a signal obtained from the data read out from the image memory 28 and converted into an analog signal by the D/A converter 31.

Further, a switch S3 is arranged to select the signal reproduced by and output from the magnetic head 5-1 on one side "a" of the switch and the signal reproduced by the other magnetic head 5-2 on the other side "b" thereof as shown in FIG. 4. A switch S4 is arranged to select the signal reproduced by the magnetic head 5-1 on one side "a", to select the signal reproduced by the other head 5-2 on another side "b" thereof and further to select, on its side "c", the signal reproduced by the magnetic head 5-1 or 5-2 selected by the switch S3.

The reproducing system of FIG. 4 operates as follows: in a case where the image signal recorded in four tracks on the video floppy disc by the recording system of FIG. 3 is to be frame-reproduced according to the conventional still video format for confirmation on a monitor or the like, the frame reproduction is possible from two tracks located in the middle part among the four tracks formed on the video floppy disc 6. The carrier of the ID signal which has been DPSK-modulated according to information data is obtainable from these two tracks. Therefore, the magnetic heads 5-1 and 5-2 are moved by the head shifting mechanism 8 to trace the middle tracks B and C (see FIG. 2). In this instance, the connecting position of the switch S4 is on the side "c". That of the switch S3 is shifted alternately to its sides "a" and "b" at a record start point on the video floppy disc every time the disc 6 makes one turn. The signal thus output from the switch S3 is supplied to the reproduced signal processing circuit 21 to be subjected to the frequency demodulating and de-emphasis processes. After that, the signal is output from the output terminal 25 as a reproduced luminance signal. The reproduced luminance signal output from the output terminal 25 is supplied, for example, to a monitor device of the NTSC system. The contents of the image recorded on the video floppy disc thus can be confirmed. Further, at this instance, the carrier of the ID signal can be separated by the BPF 22 and demodulated into its original information data by the ID decoder 23, so that the contents of the ID signal can also be confirmed also on the monitor concurrently with the image record. Further, in cases where a high definition luminance signal which will be described later is to be output to the outside, the above-stated information data may be output at the same time.

Next, in obtaining the high definition luminance signal having a degree of resolution which corresponds to about 1300×1000 picture elements by reproducing the image signal recorded in four tracks on the video floppy disc 6, by serially writing the reproduced image signal in the image memory 28 and by carrying out the picture element interpolation at the image processing circuit 30, the reproducing system operates as described below:

The image signal recorded in the four tracks on the video floppy disc 6 is reproduced track by track, i.e., by the amount recorded in each track. The image signal thus reproduced is serially stored in the image memory 28. At a first step, the signal recorded in the track A which is as shown in FIG. 2 is reproduced by the magnetic head 5-1. In this instance, the switch S3 is on its one side "a". The switch S4 is also on its side "a". The image signal reproduced is supplied to the reproduced signal processing circuit 21 to be demodulated to the original luminance signal supplied to the A/D converter 27.

Meanwhile, a sync signal SYNC which has been separated from the reproduced image signal is supplied to the PLL circuit 26. To the PLL circuit 26 is also supplied the carrier of the ID signal which has been extracted by the BPF 22 and has the same jitter component as the reproduced image signal. The PLL circuit 26 then forms a clock signal which is for writing into the memory 28 and is phase-locked to the carrier of the ID signal.

Figure 5:
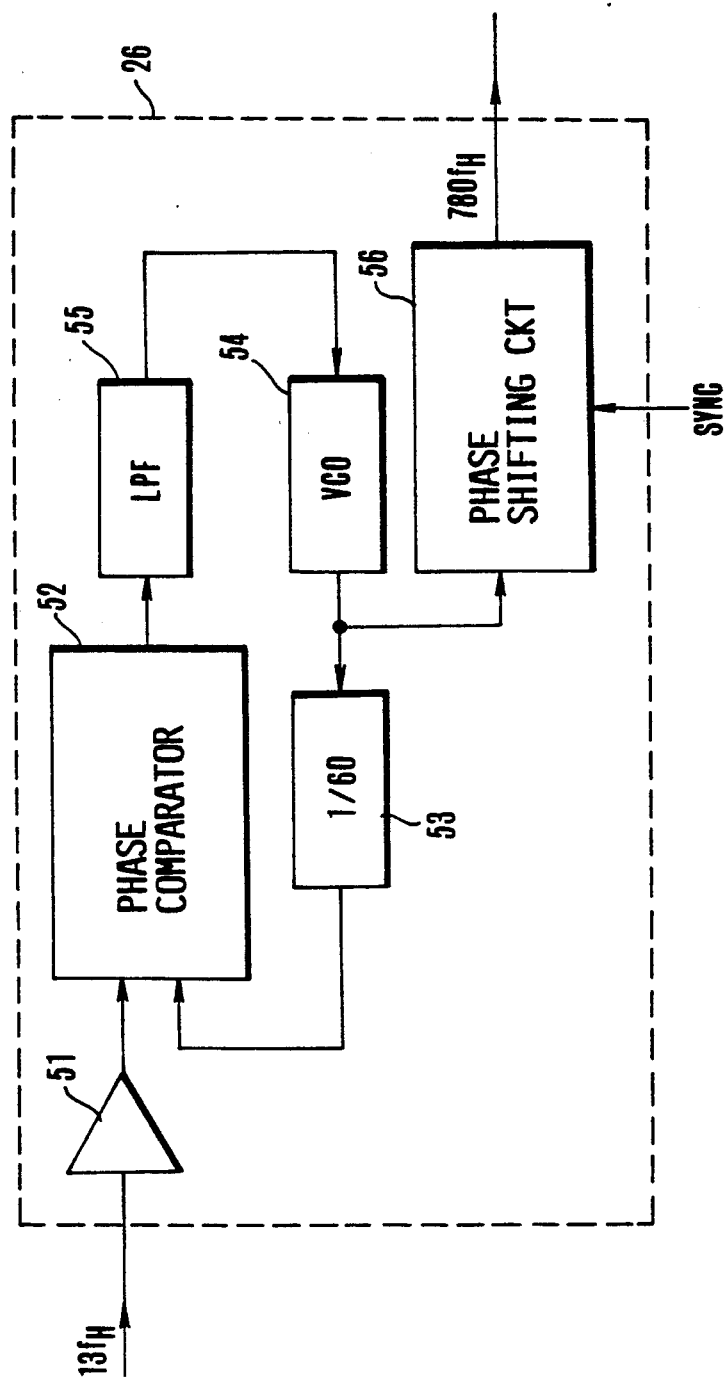
FIG. 5 is a block diagram showing the internal arrangement of a PLL circuit shown in FIG. 4.

FIG. 5 is a block diagram showing the internal arrangement of the PLL circuit 26 of FIG. 4. Referring to FIG. 5, the carrier of the ID signal of a frequency 13 fH (fH: horizontal sync frequency) supplied to the PLL circuit 26 is amplified to a suitable level by an amplifier 51. The phase of the carrier is compared by a phase comparator 52 with that of a clock signal which has been output at an oscillation frequency of 780 fH from a VCO 54 and 1/60-frequency-divided by a frequency divider 53. An error signal thus obtained is supplied to a low-pass filter (LPF) 55 to have its high frequency component removed there. The error signal is then supplied to the VCO 54 to cause the clock signal of 780 fH to be output again from the VCO 54 in a phase-locked state to the carrier of the ID signal.

The clock signal of 780 fH which has been output from the VCO 54 in the phase-locked state to the carrier of the ID signal is phase-adjusted, for accurately sampling the reproducing image signal by a phase shifting circuit 56 to a reference pulse which has been recorded and inserted in the sync signal of the image signal in recording, e.g., during a fly-back period. After the phase adjustment, the clock signal is supplied to the A/D converter 27. A luminance signal included in the image signal and supplied to the A/D converter 27 is converted into digital data on the basis of the clock signal of 780 fH. The digitized luminance signal is supplied to the image memory 28.

The sync signal SYNC separated from the reproduced image signal and the clock signal of 780 fH output from the PLL circuit 26 are supplied to the memory control circuit 29. The circuit 29 performs memory writing control over the data output from the A/D converter 27. Under this control, the data output from the A/D converter 27 is stored by the image memory 28.

After the image signal recorded in the track A on the video floppy disc 6 is also stored in the image memory 28, the image signal recorded in the track B on the video floppy disc 6 is also stored in the image memory 28 at the second step of operation in the same manner as the first step described above.

Further, in this instance, in forming the memory writing clock signal, the carrier of the ID signal which is recorded in the track A is supplied to the PLL circuit 26 as a signal to be used for this purpose. Therefore, the connecting position of the switch S4 is left on its side "a" while the other switch S3 is shifted to its side "b".

After the image signal recorded in the two tracks A and B on the video floppy disc 6 has been thus stored in the image memory 28, the magnetic head 5 is moved to the extent of two track pitches by the head shifting mechanism 8. The magnetic head 5-1 is positioned to trace the track C (see FIG. 2) and the other head 5-2 to trace the track D. This time, the memory writing clock signal is formed by using the carrier of the ID signal recorded in the track D. For this purpose, the connecting position of the switch S3 is on its side "a" and that of the switch S4 on its side "b" in reproducing the signal record from the track C; and the position of the switch S3 is shifted to the other side "b" and that of the switch S4 is shifted to another side "b" thereof in reproducing the signal record from the track D. Then, the image signals recorded in the tracks C and D on the video floppy disc 6 are digitized and stored in the image memory 28 in the same manner as in the above-stated first and second steps.

The image signals recorded in the four tracks on the video floppy disc 6 are thus stored in the image memory 28. After that, by using the data stored in the image memory 28, the image processing circuit 30 forms data for 1300×1000 picture elements by carrying out picture element interpolation for the vertical and lateral alignments of picture elements. The clock signal generator 32 produces a reading clock signal which has its reading clock pulses set at a frequency conforming to an HDTV format and supplies it to the D/A converter 31 and the memory control circuit 29. The memory control circuit 29 causes the data stored in the image memory 28 to be read out. The data read out is converted by the D/A converter 31 into an analog signal. The D/A converter 31 then outputs from the output terminal 33 a high definition luminance signal which is in conformity with the HDTV format.

Figure 6:
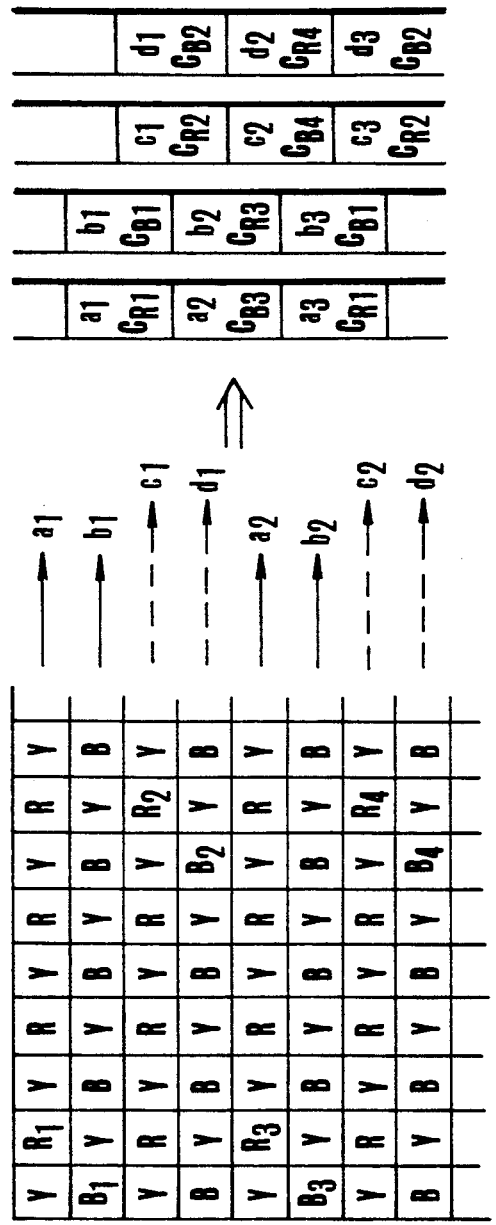
FIG. 6 shows the filter arrangement of an image sensor which has color filters and is arranged as another embodiment of the invention.

In the case of the embodiment described above, the invention is applied to a floppy camera of the kind using a black-and-white CCD. However, the black-and-white CCD may be replaced with a CCD which has color filters for red (R) and blue (B) and is arranged, for example, as shown in FIG. 6. In the case of FIG. 6, a color image signal can be recorded by allocating the signals of thinned out picture elements R1, R2, etc. and B1, B2, etc. into a color-difference line-sequential signal for each track. By this, a color image signal can be recorded and reproduced. Further, in accordance with this invention, the image sensing device used for generating the image signal does not have to be the CCD or the like as in the case of this embodiment. Some image memory or the like may be employed in place of the CCD. Further, the frequency of the clock signal for writing into the image memory is not limited to the frequency of 780 fH.

Further, while this embodiment has been described as having the recording and reproducing systems thereof arranged as separate systems, the embodiment may be arranged as a system which can be switched between recording and reproducing operations.

While the embodiment is arranged to use a two-channel magnetic head, the arrangement may be changed to use a four-channel magnetic head.

Figure 7:
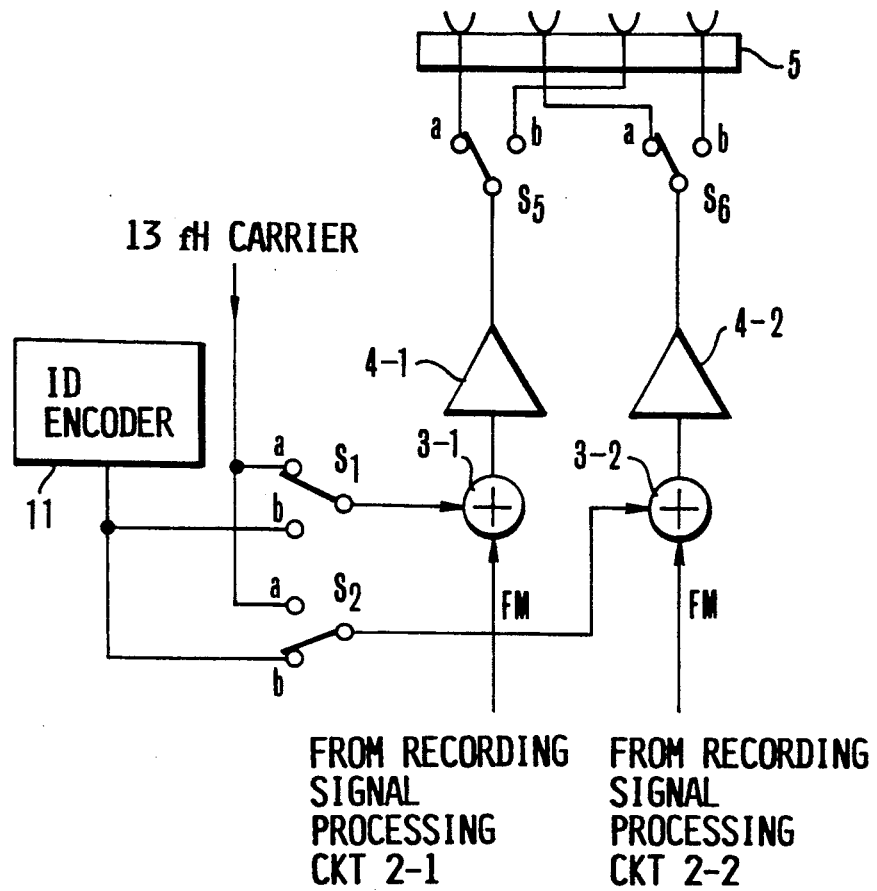
FIG. 7 shows the arrangement of the essential parts of a recording system which is arranged as a further embodiment of the invention and uses a four-channel magnetic head.

FIG. 7 shows another embodiment of the invention wherein a four-channel magnetic head is used for forming four tracks on a video floppy disc. In FIG. 7, the same component parts as those of FIG. 3 are indicated by the same reference numerals. Referring to FIG. 7, during a period of a first turn of the video floppy disc after commencement of a recording operation, the connecting position of a switch S1 is on the side "a" thereof; that of a switch S2 on its side "b"; that of a switch S5 on its side "a"; and that of another switch S6 on its side "a". During a next turn of the disc, the switch S1 is on the other side "b" thereof, the switch S2 on its side "a", the switch S5 on its side "b" and the switch S6 on its side "b".

Figure 8:
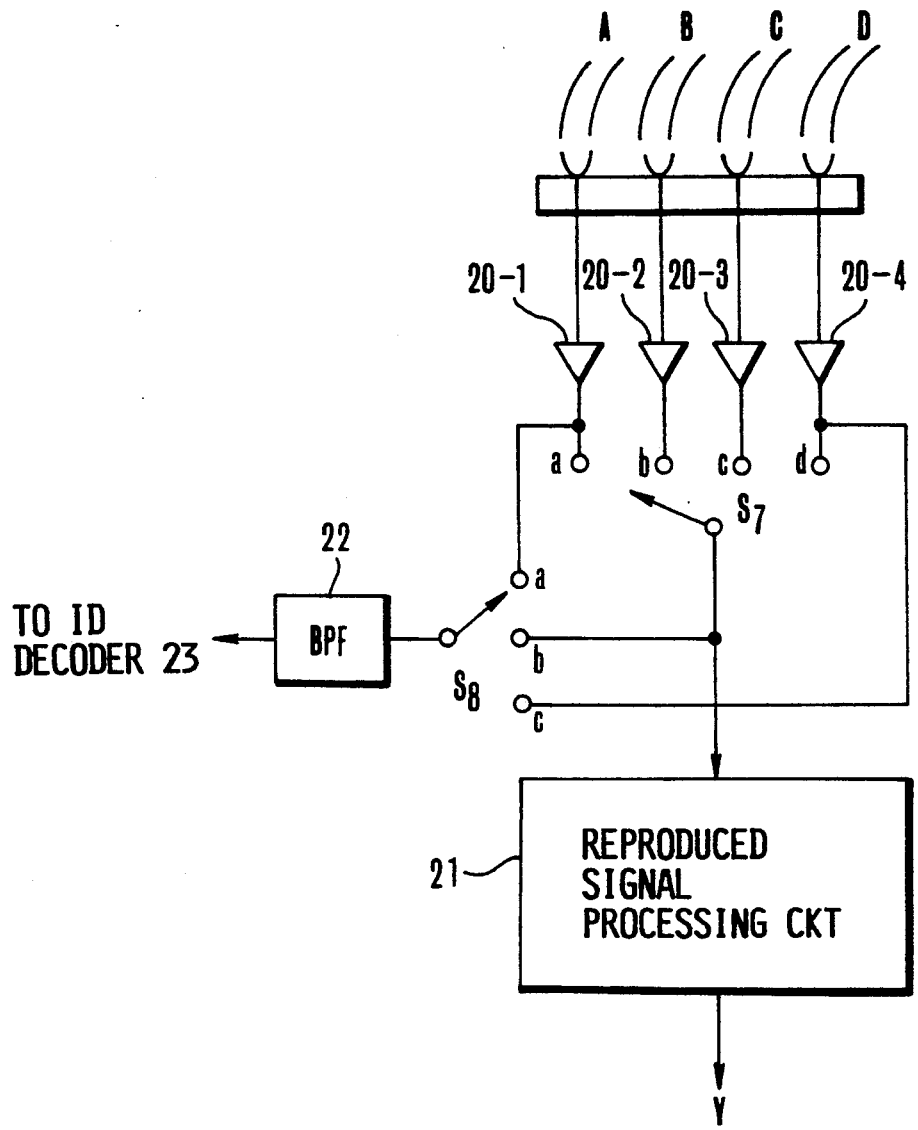
FIG. 8 shows the arrangement of the essential parts of a reproducing system which is arranged as a further embodiment of the invention and uses a four-channel magnetic head.

FIG. 8 shows a switch arrangement for switch-over of the channels of a four-channel magnetic head in reproducing an image signal recorded in four tracks on a video floppy disc.

Referring to FIG. 8, in a case where a frame-reproduced picture conforming to the conventional still video format is to be displayed on a monitor device or the like, the position of a switch S7 changes between its sides "b" and "c" every time the disc makes one turn. Meanwhile, the position of another switch S8 remains on its one side "b". In taking the image signal recorded in the four tracks into the image memory, the connecting position of the switch S7 is on its side "a" and that of the switch S8 on its side "a" for the image signal of the track A. For the image signal of the track B, the switch S7 is on its side "b" while the switch S8 remains on its side "a". For the image signal of the track C, the switch S7 is on its side "c" and the switch S8 also on its side "c". For the image signal of the track D, the switch S7 is on its side "d" while the switch S8 remains on its side "c".

As described in the foregoing, in accordance with the image signal recording method of this invention, information other than the image signal can be also recorded and reproduced; the time base variations occurring during recording and reproduction can be accurately corrected; and an image or picture can be reproduced with a high degree of fineness.

What is claimed is:

1. An image signal recording apparatus for recording, on recording medium, one picture amount of an image signal composed of a plurality of field image signals different from each other, comprising:
   a) pilot signal generating means for generating a pilot signal for correcting time base variations, which is different from a horizontal synchronizing signal;
   b) modulated carrier signal generating means for generating a modulated carrier signal modulated with an information signal other than an image signal; and
   c) recording means, arranged to input the plurality of field image signals, for recording the plurality of field image signals in different areas on the recording medium respectively, said recording means recording the modulated carrier signal generated by said modulated carrier signal generating means in a state of being multiplexed with one part of the plurality of field image signals and recording the pilot signal generated by said pilot signal generating means in a state of being multiplexed with the other part of the plurality of field image signals.

2. An apparatus according to claim 1, wherein said modulated carrier signal generating means is arranged to form the modulated carrier signal by modulating the pilot signal generated by said pilot signal generating means with an information signal other than an image signal.

3. An apparatus according to claim 1, wherein said recording means is arranged to record the plurality of field image signals respectively in a plurality of tracks formed in parallel to each other on the recording medium.

4. An apparatus according to claim 3, wherein said recording means is further arranged to record, in a state of being multiplexed with the field image signals, the modulated carrier signal generated by said modulated carrier signal generating means at least in two adjacent tracks among the plurality of tracks on the recording medium and the pilot signal generated by said pilot signal generating means at least in one track of the plurality of tracks.

5. An apparatus according to claim 1, wherein said recording medium includes a disc-shaped recording medium.

6. An image signal recording apparatus for recording, on a disc-shaped recording medium having a plurality of concentrically formed tracks, one picture amount of an image signal composed of four-field image signals different from each other, comprising:
   a) pilot signal generating means for generating a pilot signal for correcting time base variations, which is different from a horizontal synchronizing signal;
   b) modulated carrier signal generating means for generating a modulated carrier signal modulated with an information signal other than an image signal; and
   c) recording means, arranged to input the four-field image signals, for recording the four-field image signals in four tracks of the plurality of tracks formed on the disc-shaped recording medium respectively, said recording means recording the modulated carrier signal generated by said modulated carrier signal generating means in two central tracks of said four tracks in a state of being multiplexed with the field image signals and recording the pilot signal generated by said pilot signal generating means in two side tracks of said four tracks in a state of being multiplexed with the field image signals.

7. An apparatus according to claim 6, wherein said modulated carrier signal generating means is arranged to form the modulated carrier signal by modulating the pilot signal generated by said pilot signal generating means with an information signal other than an image signal.

* * * * *

UNITED STATES PATENT AND TRADEMARK OFFICE
CERTIFICATE OF CORRECTION

PATENT NO. : 5,294,997

DATED : March 15, 1994

INVENTOR(S) : Tokihiko Ogura et al.

It is certified that error appears in the above-indentified patent and that said Letters Patent is hereby corrected as shown below:

Col. Abstract, line 6, after "medium" insert -- , --.

Col. 2, line 10, change "to distant" to -- the distance --.

Col. 2, line 59, after "signal" insert -- , --.

Col. 4, line 17, change "lattice like" to -- lattace-like --.

Col. 4, line 40, after "(DPSK)" insert -- pilot --.

Col. 4, line 41, delete "pilot".

Col. 4, line 54, after "lines" insert -- , --.

Col. 4, line 56, after "lines" insert -- , --.

Col. 4, line 58, change "CCD1" to -- CCD 1 --.

Col. 5, line 38, after "signal" insert -- , --.

UNITED STATES PATENT AND TRADEMARK OFFICE
CERTIFICATE OF CORRECTION

PATENT NO. : 5,294,997  Page 2 of 2
DATED : March 15, 1994
INVENTOR(S) : Tokihiko Ogura et al.

It is certified that error appears in the above-indentified patent and that said Letters Patent is hereby corrected as shown below:

Col. 5, line 50, after "ratus" insert -- , --.

Col. 5, line 58, after "camera" insert -- , --.

Col. 5, line 59, delete ",".

Col. 5, line 61, after "FIG. 3" insert -- , --.

Col. 7, line 2, delete "also" (second occurrence)

Col. 7, line 5, after "signal" insert -- , --.
Col. 8, line 27, after "S4" insert -- is --.
Col. 9, line 49, change "be also" to -- also be --.

Signed and Sealed this

Twenty-seventh Day of September, 1994

Attest:

BRUCE LEHMAN

*Attesting Officer*    *Commissioner of Patents and Trademarks*